Figure 1:
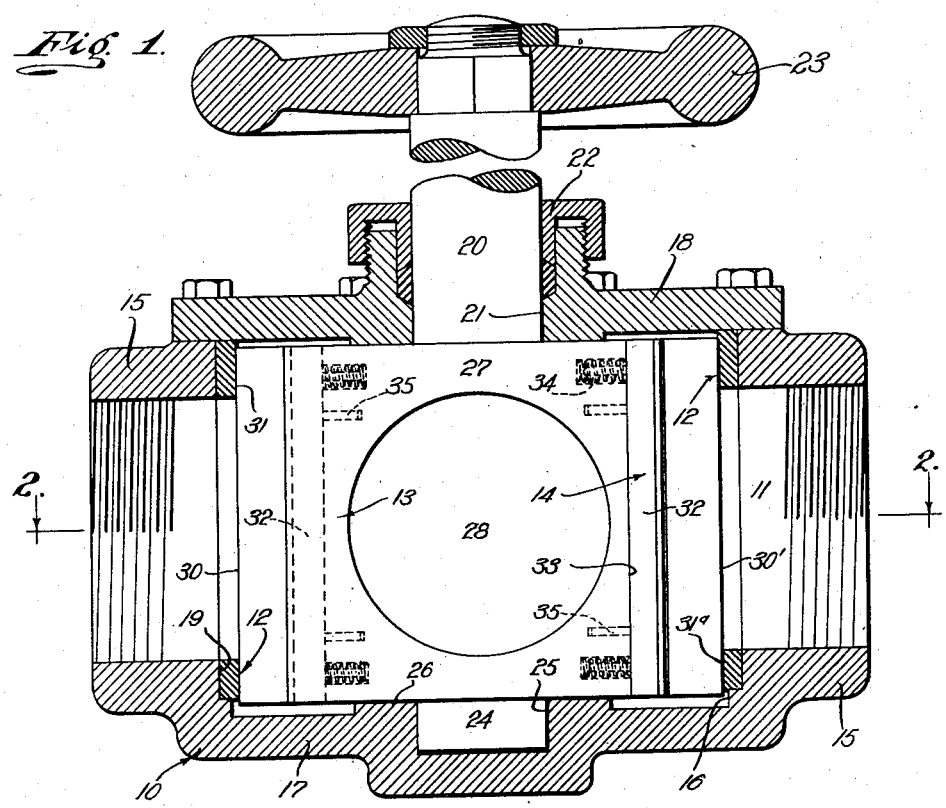

Oct. 1, 1935.   C. H. HARDIES   2,015,849
VALVE
Filed April 16, 1932   2 Sheets-Sheet 1

Inventor
Charles H. Hardies
By His Attorney

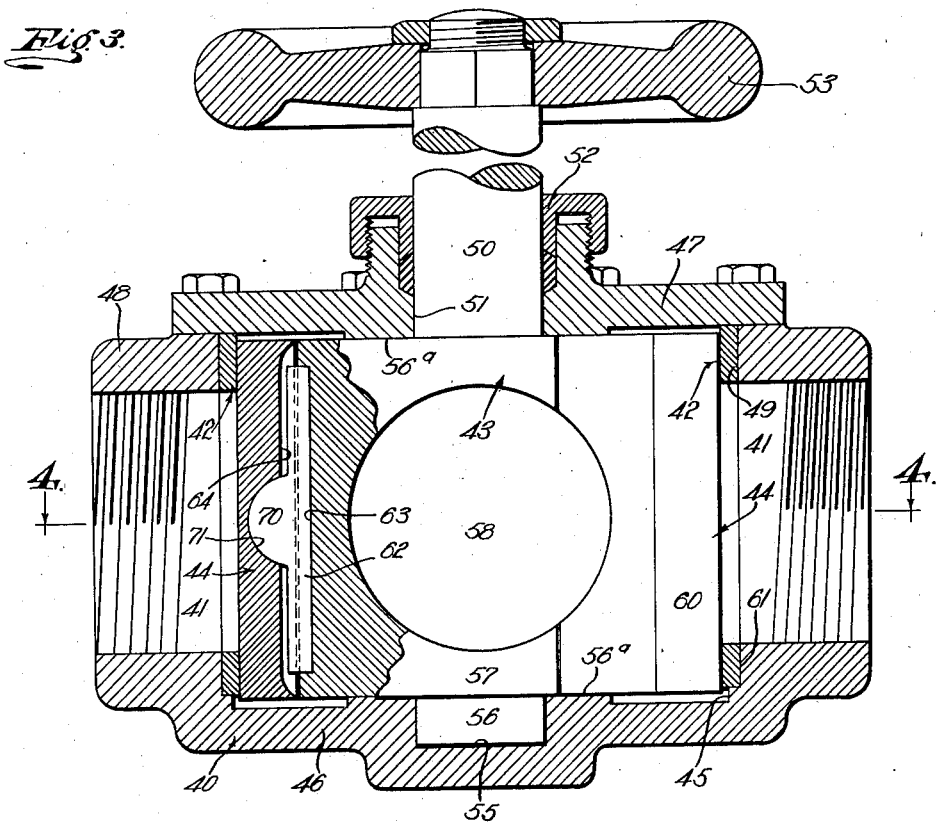
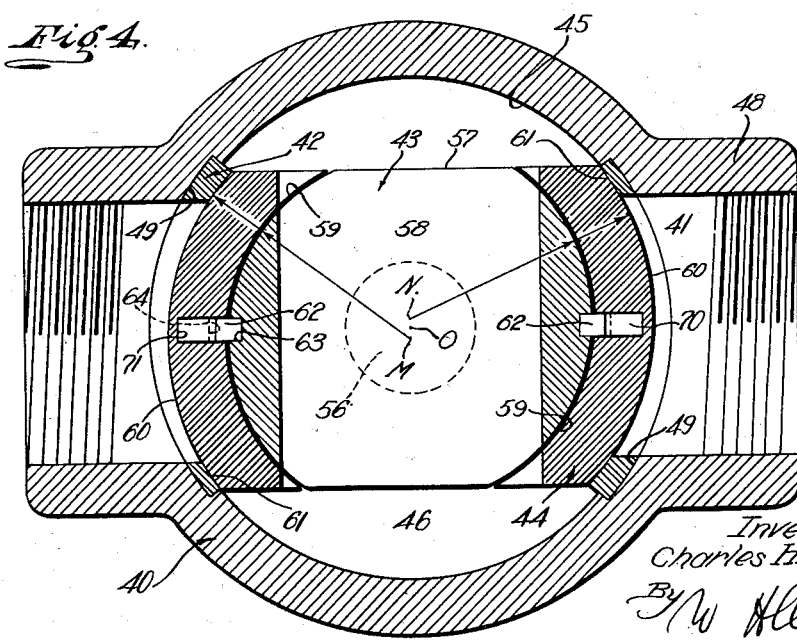

Patented Oct. 1, 1935

2,015,849

UNITED STATES PATENT OFFICE 2,015,849

VALVE

Charles H. Hardies, Southgate, Calif.

Application April 16, 1932, Serial No. 605,664

1 Claim. (Cl. 251—102)

This invention relates to a valve or stop cock and it is a general object of the invention to provide a simple, practical and inexpensive stop cock that is adapted to effectively handle fluid at high pressures.

Great difficulty has been encountered in providing a stop cock that will efficiently handle fluid at high pressures and that is easy to operate. High fluid pressures often cause distortion of the parts of a stop cock that results in leakage. When the fluid handled contains solid matter, particles of the solid matter become lodged between the sealing faces of the stop cock and cause scoring when the plug of the cock is turned between the open and closed positions. The scoring or grooves thus formed initially cause only slight leakage but soon enlarge into channels that render the stop cock ineffective. The forms of stop cocks in general use involve large sealing faces that are in sliding engagement during opening and closing, and make operation of the plug very difficult especially where changes in temperature occur.

An object of the present invention is to provide a stop cock that is capable of effectively handling fluid at high pressures and under various temperature conditions without distortion or jamming of the parts and without leakage.

It is another object of the invention to provide a stop cock in which the sealing faces and sealing parts are subjected to little or no shearing action or sliding frictional engagement with the plug is operated between the open and closed positions.

It is another object of the invention to provide a stop cock that is operable to seal off the flow equally well in both directions.

It is another object of the invention to provide a stop cock in which the sealing faces are maintained free of solid matter, corrosion, etc.

It is another object of the invention to provide a stop cock that is compact in its general construction, and in which the body may be of comparatively small diameter.

It is another object of the invention to provide a stop cock that automatically compensates for the wearing of the sealing faces.

It is another object of the invention to provide a stop cock in which the sealing action is not affected or impaired by variations in the temperature of the fluid handled.

It is another object of the invention to provide a stop cock in which very heavy mechanical sealing pressures may be obtained at the sealing faces if desired.

It is a further object of the invention to provide a stop cock in which the sealing faces separate or move apart immediately upon the plug being cracked or started toward the open position, making the plug very easy to operate, and materially lessening the danger of scoring the sealing faces.

Figure 2:
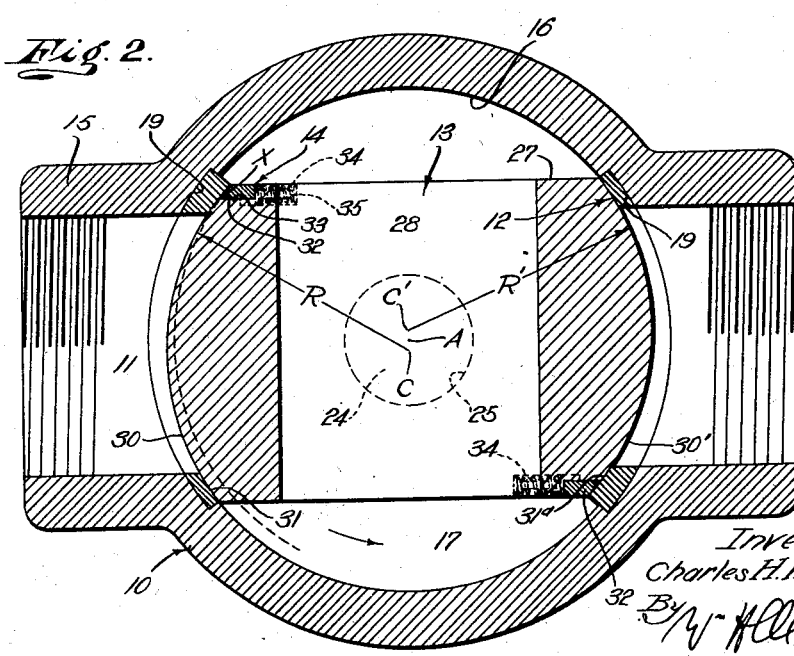

Further objects and features of the invention will be best and more fully understood from the following detailed description of typical forms and applications of the invention, throughout which description reference will be had to the accompanying drawings, in which:

Fig. 1 is a vertical detailed sectional view of one embodiment of the present invention showing the plug in elevation and in the closed position. Fig. 2 is a horizontal detailed sectional view taken as indicated by line 2—2 on Fig. 1. Fig. 3 is a vertical detailed sectional view of another form of the invention showing the plug in the closed position, and showing a portion of the plug broken away to appear in vertical section. Fig. 4 is a horizontal detailed sectional view taken as indicated by line 4—4 on Fig 3.

The embodiment of the invention illustrated in Figs. 1 and 2 of the drawings, includes, generally, a body 10 having a fluid passage 11, seats 12 in the body 10 around the fluid passage 11, a core or plug 13 in the body operable to cooperate with the seats 12 to control the flow through the passage 11, and means 14 for scraping and cleaning the seats 12.

The body 10 may be varied considerably in design and construction to adapt the stop cock for use in various situations, and for handling various classes of fluids. In the drawings I have illustrated a typical structure of generally cylindrical configuration. The fluid passage 11 extends horizontally or diametrically through the body 10 and is preferably round in cross section. Projecting tubular bosses 15 are provided on the body 10 at opposite ends of the fluid passage 11. Suitable means is provided at each end of the passage 11 to facilitate connection of the body 10 in a pipe line or conduit. In the particular case illustrated, the bosses 15 are internally screw-threaded to receive the threaded ends of pipe sections, or the like. The body 10 is hollow, having a vertical or longitudinal opening 16 for carrying the plug 13. The longitudinal axis of the opening 16 intersects and is normal to the longitudinal axis of the fluid passage 11. In accordance with the invention, the body opening 16 may be of round cross section and of uniform size and configuration throughout its length. The lower end of the opening 16 is closed by an integral wall 17 of the body, while the upper end of the opening is closed by a plate or cap 18.

The seats 12 are provided on the walls of the opening 16 and surround the ends of the passage 11 where it joins or intersects the opening 16. The two seats 12 are alike and oppose one another. The seats 12 may be formed of bronze or other suitable material and may be mounted in the body 10 so that they may be readily renewed or replaced. In the drawings I have illustrated the seats 12 retained in longitudinal recesses 19 in the walls of the body opening 16. The recesses 19 extend to the upper end of the opening 16 so that the seats 12 may be readily arranged in position and easily removed for replacement, etc. It is to be understood that the seats 12 fit or are secured in the recesses 19 so that they are positively held against turning or circumferential movement in the opening 16. The active or sealing faces of the seats 12 will be subsequently described in connection with the description of the plug 13.

The plug 13 is turnable or rotatable in the opening 16 and is provided to control the flow of fluid through the passage 11. A stem 20 projects from the upper end of the plug 13 and extends through an opening 21 in the cap 18. A suitable packing gland 22 is provided on the cap 18 to seal about the stem 20. An operating handle 23 may be provided on the projecting upper end of the stem 21. A stub stem 24 is provided on the lower end of the plug 13 and operates in a socket 25 in the lower wall 17 of the body. The opposite ends of the plug 13 are preferably of substantially equal area whereby the fluid pressures exerted on the opposite ends of the plug are practically equalized. The stems 20 and 24 rotatably carry the plug 13 so that it is rotatable about an axis A. The axis A of rotation of the plug 13 intersects the longitudinal axis of the fluid passage 11 and is normal to the axis of the fluid passage. The upper and lower ends of the plug 13 are preferably flat and normal to its longitudinal axis. An annular rim or seat 26 is provided around the upper end of the socket 25 to cooperate with the flat lower end of the plug 13 to aid in supporting the plug. The flow controlling plug 13 is provided with two flat parallel sides 27. A transverse opening 28 is provided in the plug 13 and has its opposite ends at the flat sides 27. The plug 13 is adapted to be turned between a position where its opening 28 is coaxial with the fluid passage 11 and a position where the opening 28 is transverse of the passage 11.

Two diametrically opposite cylindrical surfaces 30 and 30' are provided on the plug 13 between its flat sides 27. The cylindrical surfaces 30 and 30' are provided to cooperate with sealing faces 31 and 31a on the seats 12 to seal about the ends of the fluid passage 11. The surfaces 30 and 30' may extend the entire length of the plug 13, while the sealing faces 31 and 31a preferably extend the entire lengths of the seats 12. In accordance with the invention, the cylindrical surfaces 30 and 30' are eccentric to the axis of rotation A of the plug 13, that is, they have radii R and R', respectively, generated from centers C and C' spaced from the axis A. The centers or center lines of curvature C and C' are diametrically opposite or lie in a plane intersecting the axis of rotation A of the plug 13 and at right angles to the longitudinal axis of the passage 11. The radii of curvature R and R' are of equal length and are equally spaced from the axis of rotation A of the plug 13.

The sealing faces 31 and 31a of the two opposed seats 12 are concave and formed to effectively cooperate with or to be engaged by the cylindrical surfaces 30 and 30' of the plug. The cylindrical concave sealing faces 31 and 31a are of the same respective curvature as the surfaces 30 and 30' that is, they are curved about the centers C and C' and have radii substantially the same as the radii R and R'. The center lines of curvature of the sealing faces 30 and 30' lie in a plane transverse of the longitudinal axis of the passage 11. The seats 12 may be proportioned and related to the recesses 19 to each have a vertical edge substantially flush with the wall of the body opening 16, and a vertical edge projecting from the wall 11 of the body opening. The walls of the recesses 19 and the outer surfaces of the seats may be concentrically curved about the axis A.

When the plug 13 is turned from the open position to the closed position, the cylindrical surfaces 30 and 30' wedge against the sealing faces 31 and 31a to tightly seal therewith, and effectively close off the fluid passage 11. It will be noted that only slight sliding engagement occurs when the plug 13 is operated to the closed position where the surfaces 30 and 30' seal with the sealing faces 31 and 31a. The engagement between the cylindrical surfaces of the plug and the sealing faces of the seats 12 properly centers the plug 13 and provides equal sealing or mechanical pressures on the opposite sides of the plug. It is to be noted that the plug 13 operates to seal or close off each end of the fluid passage 11 tightly and equally well. When the plug 12 is operated or turned from the closed position to the open position in the direction indicated by the arrow in Fig. 2, the surfaces 30 and 30' move away from the sealing faces 31 and 31a radially as well as circumferentially. During movement of the plug 13 from the closed to the open position, the point X at a vertical edge of the sealing surface 30, follows the path indicated by the broken line in Fig. 2, while the corresponding point on the surface 30' follows a like path. The projecting ends of the seats 12 operate to limit opening movement of the plug. It will be apparent that the cylindrical surfaces 30 and 30' move away from or inward from the faces of the seats 12 upon the initial movement of the plug 13 toward the open position, so that there is very little sliding frictional engagement between the sealing faces of the seats and plug. This relationship provides for the free operation of the plug between the open and closed positions. When the plug 13 is in the open position, fluid pressure is admitted around the plug and at the opposite ends of the plug. As the plug 13 is symmetrical and has surfaces of equal area at its opposite sides and ends, the pressures on it are all equalized.

The means 14 operates to scrape and clean the sealing faces 31 and 31a during operation of the plug 13 from the open to the closed positions. The means 14 includes vertical scrapers or blades 32 slidable in notches or grooves 33 at the advancing vertical edges of the sealing surfaces 30 and 30'. Springs 34 retained under compression act on the inner edges of the blades 32 to urge the blades outwardly into pressural engagement with the sealing faces 31 and 31a. Pins 35 may be provided to guide the scraping or cleaning blades 32. When the plug 13 is moved from the open to the closed position, the blades 32 operate to remove any solid matter from the sealing faces of the seats 12.

It is believed that the operation of the form of the invention illustrated in Figs. 1 and 2 will be readily apparent from the foregoing description. When the plug 13 is in the open position where its opening 28 is aligned with the fluid passage 11, the flow through the stop cock is not restricted, and fluid under pressure is admitted to the opposite ends of the plug as well as to both sides of the plug. This permits the easy and free operation of the plug. Further, when the plug is in the open position, the surfaces 30 and 30' are free of or spaced from the walls of the body as well as the seats 12, so that there is no frictional mechanical resistance offered to the operation of the plug. Movement of the plug 13 to the closed position brings the cylindrical surfaces 30 and 30' into wedging and sealing engagement with the sealing faces 31 and 31ª of the seats. The eccentricity of the sealing faces provides for the tight and effective cooperation between them so that the plug may be brought to a position where the flow through the passage 11 is fully stopped without exerting great pressure or turning force on the plug. If desired, very heavy effective sealing pressures may be obtained on the sealing faces of the plug and seats 12 to completely stop the flow of fluid at high pressures without leakage. It is to be noted that any wear that may occur on the sealing parts is automatically compensated for by slightly increased turning of the plug to bring about effective sealing cooperation between the plug and seats. The seats 12 may be readily removed for resurfacing or replacement and are simple, inexpensive parts. The stop cock involves only two main parts, namely the body and plug, and they are extremely simple and inexpensive of manufacture.

The form of the invention illustrated in Figs. 3 and 4 of the drawings includes, generally, a body 40 having a fluid passage 41, seats 42 in the body around the passage 41, a plug 43 controlling the flow of fluid through the passage 41, and shoes 44 on the plug for cooperating with the seats 42.

The body 40 may be substantially identical with the body 10 described above, that is, it may be cylindrical in its general configuration and have a vertical opening 45 closed at its lower end by a wall 46 and closed at its upper end by a cap 47. Internally threaded bosses 48 may be provided on the opposite ends of the fluid passages 41 to facilitate connection of the body in a pipe line. The fluid passage 41 is preferably of round cross section and extends diametrically through the body. The longitudinal opening 45 intersects the passage 41 and is at right angles to the passage 41.

The seats 42 may be identical to the seats 12 previously described. The seats 42 surround the ends of the passage 41 and may extend the entire length of the opening 45. In the preferred construction, the seats 42 are replaceably carried in recesses 49 in the walls of the body opening 45.

The plug 43 is turnable in the opening 45 about a vertical axis O. A stem 50 is provided on the upper end of the plug 12 and extends through an opening 51 in the cap 47. A packing gland 52 may be provided on the cap 47 to seal about the stem, and a suitable handle 53 may be provided on the projecting upper end of the stem. A stub shaft 56 is provided on the lower end of the plug 43 to cooperate with a socket 55 in the body wall 46. Annular bearing rims or seats 56ª may be provided to cooperate with the flat upper and lower ends of the plug. The plug 43 is provided with two flat parallel sides 57 and has a transverse opening 58 terminating at the flat sides 57. Cylindrically curved ends or surfaces 59 are provided on the plug 43 between the flat sides 57. The cylindrical ends 59 are eccentric to the axis of rotation O of the plug 43 being curved about centers M and N spaced from the axis of the plug. The centers of curvature M and N are diametrically opposite and are equally spaced from the axis of rotation O of the plug. The centers of curvature M and N lie in a vertical plane including the longitudinal axis of the plug opening 58. The cylindrical eccentric surfaces 59 extend the entire length of the plug 43.

The shoes 44 are arranged on the cylindrical sides of the plug and are operable to cooperate with the seats 42 when the plug is in the closed position. The shoes 44 are curved in cross section, having their inner and outer sides cylindrically curved about the centres of curvature M and N. The shoes 44 preferably extend the entire length of the plug 43. The outer faces 60 of the shoes 44 are adapted to cooperate with or wedge against the sealing faces 61 of the seats 42. The faces 61 are curved about the centers M and N so as to properly receive the shoes 44. The shoes 44 are connected to the plug 43 by longitudinal keys 62. The keys 62 are carried in longitudinal key ways 63 and 64 in the plug and inner sides of the shoes 44. The outer edges of the keys 62 are provided intermediate their ends with pivot projections 70. The projections 70 are curved or rounded and cooperate with correspondingly shaped sockets 71 in the outer walls of the key ways 42. The keys 62 have considerable clearance in the key ways 64 allowing the projections 70 to rock or tilt in the sockets 71. Suitable clearance is provided between the shoes 44 and the plug 43 to allow the shoes to tilt. The keys 62 cooperate with the key ways 64 to allow both limited horizontal and vertical tilting of the shoes. The shoes 44 are free to tilt and properly center thermselves on the seats 42 to compensate for any misalignment of the plug 43.

The operation of the embodiment of the invention illustrated in Figs. 3 and 4 is substantially identical with that of the previously described embodiment. The shoes 44 in having limited tilting movement relative to the plug 43 are free to properly cooperate with the seats 42 when the plug 43 is operated to the closed position. The shoes 44 may compensate for any slight misalignment or fitting of parts, or distortion of parts from extremely high pressures or temperature changes. If desired or found practical, the seats 42 and/or the shoes 44 may be lined or provided with resilient sealing material. The plug 43 is extremely easy to operate, as the shoes move inwardly away from the seats 42 at the start of the opening movement of the plug. The parts of the stop cock are all simple and inexpensive of manufacture and are not easily affected by heavy fluid pressures or temperature variations.

Having described only typical preferred forms of my invention, I do not wish to limit myself to the specific details set forth, but wish to reserve to myself any changes or variations that may appear to those skilled in the art, or fall within the scope of the following claim:

Having described my invention, I claim:

A stop cock including a body having a fluid passage, a plug intersecting said passage for controlling the flow of fluid through the passage, shoes for cooperating with the body for sealing off the flow of fluid through the passage, and means connecting the shoes with the plug including key connections between the plug and shoes for transmitting rotational forces between the plug and shoes and allowing limited horizontal and vertical pivoting of the shoes relative to the plug, said connections including keys on the plug pivotally cooperating with keyways in the shoes, for transmitting rotational forces, the keys and keyways related to allow pivoting of the shoes in one direction, and rounded projections on the keys cooperating with rounded portions of the keyways whereby the shoes may pivot in the other direction.

CHARLES H. HARDIES.